United States Patent Office 2,889,256

Patented June 2, 1959

2,889,256

PURIFICATION OF HEXAMETHYLENE DIAMINE

Charles R. Campbell, Pensacola, Fla., assignor to The Chemstrand Corporation, Decatur, Ala., a corporation of Delaware No Drawing. Application April 4, 1956
Serial No. 575,979

7 Claims. (Cl. 202—46)

This invention relates to the purification of hexamethylene diamine, and more particularly it relates to such purification by the removal of dissolved ammonia therefrom.

It is well known that hexamethylene diamine is a prime intermediate for polyamides. It is equally well known that it is necessary that all impurities from the refined hexamethylene diamine employed for polyamide manufacture be effectively removed. In the prior practice these impurities have been removed by fractional distillation alone. However, one major impurity, dissolved ammonia, has not been effectively removed by fractional distillation treatments alone. Ammonia is normally generated under the conditions of heating required for fractional distillation of hexamethylene diamine, and such generated ammonia redissolves in the condensed hexamethylene diamine vapors. For this reason it has frequently been impossible to reduce the concentration of ammonia in refined hexamethylene diamine to a value below about 100–300 parts per million of ammonia. This residue of ammonia in refined hexamethylene diamine has constituted a distinct problem in the manufacture of polyamides.

An object of the present invention is to provide a process for purifying refined hexamethylene diamine generally. A further object is to provide a process for reducing the ammonia content of the refined hexamethylene diamine. A still further object of the present invention is to provide a simple and expedient process for the substantial purification of refined hexamethylene diamine. A still further purpose of the invention is the removal of ammonia from hexamethylene diamine during the final refining stage requiring no additional steps. Other objects will be apparent from the description of the invention hereinafter.

The above and other objects are accomplished according to the present invention by contacting liquid hexamethylene diamine containing dissolved ammonia with an inert gas. The amount of inert gas required for substantial removal of dissolved ammonia varies with the amount of ammonia dissolved in the particular liquid hexamethylene diamine, but generally is an amount of from 0.001 to 15 cubic feet per pound of liquid hexamethylene diamine. Preferably the amounts range from .01 to 2.0 cubic feet per pound of liquid hexamethylene diamine contacted.

Any gas inert to the liquid hexamethylene diamine under the conditions of contacting treatment is suitable for the removal of the dissolved ammonia. Examples of such suitable inert gases include nitrogen, carbon dioxide free air, and the combustion product of burned methane gas from which carbon dioxide has been removed by scrubbing.

The method of contacting can be any of the several forms so long as the hexamethylene diamine to be purified is in the form of a liquid and the contacting inert gas is thoroughly and completely mixed with the hexamethylene diamine to be purified. One convenient method is that of sparging the inert gas up through a vessel of liquid hexamethylene diamine in order to remove the dissolved ammonia. No particular design or shape of sparging vessel is required, but may be subject to the convenience of the specific installation, as can be the design of the sparging ring or head employed to introduce the inert gas. Such sparging is particularly advantageous as a method of concurrently mixing and contacting the liquid hexamethylene diamine being treated.

It has also been found that hexamethylene diamine suitable for treatment by this sparging method should be as free of water as is reasonably possible, such as hexamethylene diamine partially or completely fractionally distilled. Very concentrated solutions of hexamethylene diamine in water have been found not to be subject to the removal of ammonia by this method. This is presumably the result of the very high solubility of ammonia in water. However, it has also been found that the saturation with water of the inert gas employed for the removal of ammonia had practically no effect upon its efficiency in such removal. Thus, no precautions need to be taken to maintain the inert gas free from water vapor.

Another most convenient method of even greater economy than the sparging method just detailed is that of contacting hexamethylene diamine while being fractionally distilled within a distillation column with an inert gas. In this method the amount of inert gas required for removal of dissolved ammonia varies not only with the amount of ammonia dissolved in the particular hexamethylene diamine, but also with the rate of reflux at which the fractional distillation is being conducted and the total throughout of hexamethylene diamine. Generally, an amount of from 0.001 to 1.0 cubic foot per pound of hexamethylene diamine is effective to decrease the concentration of ammonia in the hexamethylene diamine by several fold. Preferably the amount of inert gas employed ranges from about 0.01 to about 0.2 cubic foot per pound of hexamethylene diamine being purified. This last stated range of preferable amounts of inert gas is capable of substantially eliminating ammonia from fractionally distilled hexamethylene diamine and the latter value is not so great as to impair the fractionating efficiency of the column or result in excessive entrainment losses of diamine through dilution with the inert gas.

The point of introduction of the inert gas into the fractional distillation column and its associated condenser is not critical. The inert gas can be introduced at the base of the column, at any point along the length of the column, at the top of the distillation column, or at the inlet of the associated condenser with equally effective results. Column efficiency is not reduced by the introduction of the inert gas at the bottom or near the bottom of the refining column. Neither is the efficiency of the ammonia purging of the inert gas lost by its introduction at the inlet of the refining column's associated condenser.

The method of removing ammonia from hexamethylene diamine undergoing fractional distillation is usually employed in the final refining stage of the hexamethylene diamine recovery process. Its use before this stage might well result in no final effect due to the tendency of refluxing hexamethylene diamine to generate additional ammonia.

The method of the present invention can be employed in the final fractional distillation column of any hexamethylene diamine recovery process irrespective of the number of prior refining stages which the process may incorporate. It is evident that no precautions need be taken to free the hexamethylene diamine in its final refining stage from water, since it will have been removed in prior stages of purification.

The following examples will serve to further illustrate the specific embodiments of the invention.

EXAMPLE I

A sample of 150 grams of hexamethylene diamine refined by means of fractional distillation was placed in an open vessel. The sample contained 243 moles of ammonia per million moles of hexamethylene diamine. The sample was heated by means of a steam bath and maintained at 50° C. It was thereafter sparged for a period of one hour with 0.15 cubic foot of nitrogen, which represented an inert gas flow rate of 0.45 cubic foot of nitrogen per pound of hexamethylene diamine contacted. At the end of the one hour period of sparging the sample had an ammonia content of 26 moles per million moles of hexamethylene diamine.

EXAMPLE II

A sample of fractionally distilled hexamethylene diamine of 150 grams possessing an ammonia content of 259 moles per million moles of hexamethylene diamine was sparged with nitrogen in the same manner as set out in Example I above. The amount of nitrogen gas employed was 0.31 cubic foot which corresponded to a rate of 0.92 cubic foot per pound of hexamethylene diamine treated. At the end of the sparging period the sample was found to contain 17 moles of ammonia per million moles of hexamethylene diamine.

EXAMPLE III

A sample of 150 grams of refined hexamethylene diamine containing 250 moles of ammonia per million moles of hexamethylene diamine was sparged at 50° C. with nitrogen gas in the same manner as set out in Example I. The amount of inert gas employed was 0.23 cubic foot, which corresponded to a rate of 0.68 cubic foot of nitrogen per pound of hexamethylene diamine contacted. At the end of the sparging period the ammonia content of the sample was found to have been reduced to three moles per million moles of hexamethylene diamine contacted.

EXAMPLE IV

A sample of 150 grams of refined hexamethylene diamine containing 759 moles of ammonia per million moles of hexamethylene diamine was sparged with nitrogen gas in the same manner as set out in Example I. The amount of inert gas employed was 0.40 cubic foot, which corresponded to a rate of 1.21 cubic feet of nitrogen per pound of hexamethylene diamine contacted. At the end of the sparging period the sample was found to contain 65 moles of ammonia per million moles of hexamethylene diamine.

It is evident from the above examples that by the method of this invention the dissolved ammonia content of refined hexamethylene diamine can be reduced several fold so as to eliminate this impurity which cannot be successfully removed by fractional distillation. It should be noted that the temperature at which the above experiments were conducted was standardized for the purpose insuring the liquidity of the samples treated. The process will work equally as well at any temperature above the melting point of the hexamethylene diamine.

EXAMPLE V

A continuous fractional distillation of hexamethylene diamine containing dissolved ammonia was carried out in which conditions in the commercial refining of hexamethylene diamine were closely simulated. A still pot was charged with 100 grams of the final refining column residue and one gram of carbon steel turnings and was then fitted with a two-foot fractional distillation column packed with stainless steel helices. The still pot was provided with means of continuous introduction of a portion of the feed to a hexamethylene diamine refining column of a commercial system. Provision was also made for introduction of nitrogen gas just below the packed column. Distillation was commenced after the introduction of 200 milliliters of the feed at 37 mm. of mercury vacuum. Thereafter cuts of 100 milliliters were taken and the inert gas employed on alternate cuts. The ammonia content in moles per million moles of hexamethylene diamine was determined for each cut of hexamethylene diamine from the distillation column described. The results are summarized in Table I below:

*Table I*

| Cut | Feed, ml. | Make, ml. | Nitrogen Purge (ft.$^3$) | Nitrogen, Ft.$^3$/lb. HMD | $NH^3$, mpm. |
|---|---|---|---|---|---|
| 1 | 100 | 100 | None | None | 29 |
| 2 | 100 | 100 | .015 | .09 | 7 |
| 3 | 100 | 100 | None | None | 38 |
| 4 | 100 | 100 | .009 | .05 | 13 |
| 5 | 90 | 100 | None | None | 42 |
| 6 | 100 | 100 | .028 | .17 | 12 |

It is evident from the above laboratory distillation that the ammonia content of refined hexamethylene diamine was reduced by the process of the present invention to an average value of about 12 moles per million moles of hexamethylene diamine. It should be pointed out that all the ammonia concentrations reported are unusually low because of the superior efficiency of the laboratory column employed.

EXAMPLE VI

Hexamethylene diamine was purified by the method of the present invention while subjected to the final or refining stage of fractional distillation. Continuous fractional distillation without the use of an inert contacting gas was modified by the use of continuous introduction of inert gas at various points in the final refining stage for a sufficient period to obtain one complete receiver of purified refined hexamethylene diamine. In this test the point of introduction of the inert gas was the inlet of the associated column condenser. The refining column was operated under a head pressure of 37 mm. of mercury. During the period of introduction of the nitrogen gas the rate of introduction of the nitrogen gas was 83.5 cubic feet per hour, corresponding to a rate of 0.020 cubic foot per pound of hexamethylene diamine charged. The ammonia level in the refined hexamethylene diamine contained in the column receiver was determined just prior to beginning introduction of the inert gas and in the second receiver after the use of inert gas was terminated. The ammonia level was determined to be 234 moles of ammonia per million moles of hexamethylene diamine prior to beginning the introduction of inert gas and 214 moles per million moles of hexamethylene diamine in the second receiver after the test was terminated. The ammonia level obtained during the test was determined on hourly samples from the receiver line, which ranged from 62 to 92 moles of ammonia per million moles of hexamethylene diamine, and on the ammonia content of the total receiver sample, which was determined to be 76 moles of ammonia per million moles of hexamethylene diamine. A significant, several fold decrease in the level of ammonia in the test receiver was realized by means of the introduction of inert gas at the inlet of the condenser.

EXAMPLE VII

Another test was conducted employing the introduction of an inert gas into the final refining column system for hexamethylene diamine in the same manner as described in Example VI above. In this test the point of introduction of the inert nitrogen gas feed was also at the inlet of the associated column condenser. The refining column was operated at a head pressure of 37 mm. of mercury. The ammonia level determined just prior to the start of the inert gas feed was 183 moles per million of moles hexamethylene diamine and determined from the second receiver after the test was terminated was 164 moles per million moles of hexamethylene diamine. Nitrogen gas was introduced during the period for the collection of the test receiver at a rate of 83.2 cubic feet per hour, which corresponded to a rate of 0.020 cubic foot per pound of hexamethylene diamine charged to the column. The ammonia level obtained during the test period determined from hourly samples ranged from 72 to 112 moles per million moles of hexamethylene diamine, and the ammonia level in a sample from the filled test receiver was determined to be 88 moles per million moles of hexamethylene diamine.

EXAMPLE VIII

An additional test was made in the refining system for hexamethylene diamine in the same manner as that described in Example VI above. In this test the point of introduction of the inert gas feed was at the bottom of the refining column. The refining column was operated at a head pressure at 37 mm. of mercury. The ammonia level as determined just prior to the test period from the prior receiver was 259 moles of ammonia per million moles of hexamethylene diamine, and as determined from the second receiver after the test was terminated was 171 moles per million moles of hexamethylene diamine. Inert nitrogen gas was charged during the period required to collect one complete receiver at a rate of 97.5 cubic feet per hour, which corresponded to a rate of 0.019 cubic foot of nitrogen gas per pound of hexamethylene diamine charged. The ammonia level obtained during the test as determined from hourly samples ranged from 63 to 99 moles per million moles of hexamethylene diamine, and the ammonia level in a sample collected from the filled test receiver was determined as 83 moles per million moles of hexamethylene diamine.

EXAMPLE IX

An additional test of the purification of refined hexamethylene diamine in the final refining column was conducted in the same manner as set out in Example VI above. In this test the point of introduction of the inert gas was just above the eleventh plate in a forty plate refining column. The inert gas employed was the combustion product of methane gas burned in air from which carbon dioxide had been removed by scrubbing with monoethanolamine and sodium hydroxide solution. During this test the refining column was operated at a head pressure of 37 mm. of mercury. The ammonia level as determined just prior to the test was established as 229 moles of ammonia per million moles of hexamethylene diamine. The rate of introduction of the inert methane combustion product was 125 cubic feet per hour, which corresponded to a rate of 0.022 cubic foot per pound of hexamethylene diamine charged. The ammonia level obtained during the test as determined from a sample collected from the test receiver was established as 56 moles of ammonia per million moles of hexamethylene diamine.

It is evident from the above examples that by this method the dissolved ammonia content of refined hexamethylene diamine can be reduced several fold during the course of the last stage of the refining of the product by the very simple and expedient procedure of introducing an inert gas in very small amounts. The ability to further purify fractionally distilled hexamethylene diamine during the final distillation stage is the chief advantage of the instant method since it can be accomplished at a negligible cost and with the only equipment modification required that of the installation of an inert gas source and line.

The chief advantage of the invention is the substantial removal of the dissolved ammonia from refined hexamethylene diamine. The invention may also be employed to reduce the ammonia concentration of finally refined hexamethylene diamine to a specific, reproducible level where its presence can be well tolerated by the polyamide manufacturing process. Another advantage is the obtaining of these results with an economical procedure requiring relatively small equipment modification and additions.

As many apparently widely different embodiments of this invention may be made within departing from the spirit and scope thereof it is to be understood that the invention is not limited to the specific embodiments thereof except as defined in the appended claims.

I claim:

1. A method for the purification of hexamethylene diamine which comprises removing dissolved ammonia by contacting liquid hexamethylene diamine containing dissolved ammonia with an inert gas selected from the group consisting of nitrogen, carbon dioxide free air, and the product of the combustion of methane which has been freed from carbon dioxide in an amount of from 0.001 to 15 cubic feet per pound of liquid hexamethylene diamine.

2. A method for the purification of hexamethylene diamine which comprises removing dissolved ammonia by sparging an inert gas selected from the group consisting of nitrogen, carbon dioxide free air, and the product of the combustion of methane which has been freed from carbon dioxide in an amount of from 0.001 to 15 cubic feet per pound of hexamethylene diamine through liquid hexamethylene diamine containing dissolved ammonia.

3. The method set forth in claim 2 wherein the inert gas is the product of the combustion of methane which has been freed from carbon dioxide.

4. A method for the purification of hexamethylene diamine containing dissolved ammonia which comprises refluxing dried hexamethylene diamine containing dissolved ammonia and fractionally distilling therefrom purified hexamethylene diamine while introducing an inert gas selected from the group consisting of nitrogen, carbon dioxide free air, and the product of the combustion of methane which has been freed from carbon dioxide in an amount of from 0.001 to 1.0 cubic foot per pound of hexamethylene diamine into the hexamethylene diamine and removing said inert gas with entrained gaseous ammonia from the fractionally distilled hexamethylene diamine.

5. A method for the purification of hexamethylene diamine containing dissolved ammonia which comprises refluxing dried hexamethylene diamine containing dissolved ammonia and fractionally distilling therefrom purified hexamethylene diamine while introducing an inert gas selected from the group consisting of nitrogen, carbon dioxide free air, and the product of the combustion of methane which has been freed from carbon dioxide in an amount of from 0.01 to 0.20 cubic foot per pound of hexamethylene diamine into the refluxing hexamethylene diamine, and separating the said inert gas with entrained gaseous ammonia from the fractionally distilled hexamethylene diamine by condensing the said hexamethylene diamine and simultaneously removing the inert gas and entrained gaseous ammonia therefrom by means of a vacuum.

6. A method for the purification of hexamethylene diamine containing dissolved ammonia which comprises fractionally distilling dried hexamethylene diamine while introducing an inert gas selected from the group consisting of nitrogen, carbon dioxide free air, and the product of the combustion of methane which has been freed from carbon dioxide in an amount of from 0.01 to 0.20 cubic foot per pound of hexamethylene diamine into the condensing distilled hexamethylene diamine and separating the said inert gas with entrained gaseous ammonia from the condensed distilled hexamethylene diamine by removing the said gases by means of a vacuum.

7. The method of claim 4 wherein the inert gas is the product of combustion of methane which has been freed from carbon dioxide.

References Cited in the file of this patent

UNITED STATES PATENTS

| | | |
|---|---|---|
| 1,244,903 | Schuster | Oct. 30, 1917 |
| 2,184,923 | Haltmeier | Dec. 26, 1939 |
| 2,255,114 | Haltmeier | Sept. 9, 1941 |
| 2,353,441 | Brown | July 11, 1944 |
| 2,522,529 | Miller et al. | Sept. 19, 1950 |

FOREIGN PATENTS

| | | |
|---|---|---|
| 731,819 | Great Britain | June 15, 1955 |